United States Patent
Sekioka

(10) Patent No.: US 12,022,362 B2
(45) Date of Patent: Jun. 25, 2024

(54) TRACKING BAND MONITORING SYSTEM, TRACKING BAND MONITORING METHOD AND NON-TRANSITORY COMPUTER-READABLE STORAGE MEDIUM

(71) Applicant: Digital AI Co., Ltd., Fukuoka (JP)

(72) Inventor: Hidehiko Sekioka, Fukuoka (JP)

(73) Assignee: Digital AI Co., Ltd., Fukuoka (JP)

( * ) Notice: Subject to any disclaimer, the term of this patent is extended or adjusted under 35 U.S.C. 154(b) by 78 days.

(21) Appl. No.: 17/917,242

(22) PCT Filed: Sep. 24, 2021

(86) PCT No.: PCT/JP2021/035066
§ 371 (c)(1),
(2) Date: Oct. 6, 2022

(87) PCT Pub. No.: WO2022/065427
PCT Pub. Date: Mar. 31, 2022

(65) Prior Publication Data
US 2023/0156428 A1    May 18, 2023

(30) Foreign Application Priority Data
Sep. 25, 2020  (JP) ................................. 2020-160458

(51) Int. Cl.
*H04W 4/029*    (2018.01)
(52) U.S. Cl.
CPC ........ *H04W 4/029* (2018.02); *H04M 2207/18* (2013.01)

(58) Field of Classification Search
CPC .................................................... H04W 4/029
See application file for complete search history.

(56) References Cited

U.S. PATENT DOCUMENTS

2020/0112834 A1* 4/2020 Villa ..................... G01S 5/0294
2022/0068104 A1* 3/2022 Wilson .................. H02J 7/0048

FOREIGN PATENT DOCUMENTS

| JP | 2007184754 | 7/2007 |
| JP | 2010279498 | 12/2010 |
| JP | 2014213071 | 11/2014 |
| JP | 2016110308 | 6/2016 |

(Continued)

OTHER PUBLICATIONS

"International Search Report (Form PCT/ISA/210) of PCT/JP2021/035066," mailed on Dec. 21, 2021, with English translation thereof, pp. 1-4.

(Continued)

*Primary Examiner* — Nabil H Syed
*Assistant Examiner* — Cal J Eustaquio
(74) *Attorney, Agent, or Firm* — JCIPRNET

(57) ABSTRACT

The present invention addresses the problem of providing a novel technique for realizing suitable tracking band monitoring. The present invention realizes a tracking band monitoring system having a tracking band including a detection device that acquires a life log including vital data and location data of a monitoring target wearing the tracking band, a server, and a relay device that relays communication between the tracking band and the server. The present invention also realizes a tracking band monitoring method and a tracking band monitoring program.

12 Claims, 8 Drawing Sheets

(56) References Cited

FOREIGN PATENT DOCUMENTS

| | | |
|---|---|---|
| JP | 2016135172 | 7/2016 |
| JP | 2017033495 | 2/2017 |
| JP | 2017508511 | 3/2017 |
| JP | 2017131319 | 8/2017 |
| JP | 2018093977 | 6/2018 |
| JP | 2021096828 | 6/2021 |
| JP | 6905773 | 7/2021 |
| WO | 2019240062 | 12/2019 |

OTHER PUBLICATIONS

"Office Action of Japan Counterpart Application" with English translation thereof, mailed on Nov. 24, 2020, p. 1-p. 22.
"Decision to Grant a Patent of Japan Counterpart Application" with English translation thereof, mailed on Jun. 15, 2021, p. 1-p. 7.

* cited by examiner

US 12,022,362 B2

TRACKING BAND MONITORING SYSTEM, TRACKING BAND MONITORING METHOD AND NON-TRANSITORY COMPUTER-READABLE STORAGE MEDIUM

CROSS-REFERENCE TO RELATED APPLICATION

This application is a 371 of international application of PCT application serial no. PCT/JP2021/035066, filed on Sep. 24, 2021, which claims the priority benefit of Japan application no. 2020-160458, filed on Sep. 25, 2020. The entirety of each of the above-mentioned patent applications is hereby incorporated by reference herein and made a part of this specification.

FIELD OF THE INVENTION

The present invention relates to a tracking band monitoring system, a tracking band monitoring method, and a non-transitory computer-readable storage medium.

BACKGROUND ART

A tracking band is a wearable device having a detection device, such as a sensor, capable of acquiring a life log including vital data and location data of an animal, such as a human, wearing the tracking band. The tracking band can contribute to society, such as avoiding the lonely death of the elderly, tracking a wandering old person to ensure safety, by suitably utilizing various information collected by the tracking band.

The invention described in Patent Literature 1 aims to provide a wandering prevention system that effectively protects a person to be protected who may wander, including a camera, a face recognition verification device, a beacon, and a wearable terminal held by the person to be protected, wherein the wearable terminal identifies area information of a facility by using position information from the beacon and transmits the area information and prestored person-to-be-protected information to the face recognition verification device, and the face recognition verification device stores the area information and the person-to-be-protected information from the wearable terminal in a movement history database. When receiving a captured image and camera identification information from the camera, the face recognition verification device refers to the movement history database, identifies a person to be protected who has passed through a monitoring target area of the camera, and determines, by face recognition verification, whether or not an image of the person to be protected identified by using the person-to-be-protected database matches the captured image.

CITATION LIST

Patent Literature

Patent Literature 1: Japanese Unexamined Patent Publication No. 2016-110308

SUMMARY OF THE INVENTION

Technical Problem

Although the invention described in Patent Literature 1 may make the foregoing social contribution, it is difficult to say that it is suitable for operation from the viewpoint of remotely monitoring and controlling the wearable terminal itself worn by the person to be protected. It is necessary to monitor and control the wearable terminal, such as the tracking band, on a monitoring person side in order to suitably perform "tracking" related to a monitoring target such as the elderly and to monitor and protect the target while taking an unexpected situation into consideration.

In view of the foregoing circumstances, an object of the present invention is to provide a novel technique for realizing suitable tracking band monitoring.

Solution to Problem

In order to solve the foregoing problem, the present invention is a tracking band monitoring system including a relay device that relays communication between a tracking band and a server, wherein the relay device has a relay means for receiving transmission data from the tracking band and the server and transmitting respective data to the server and the tracking band and an identification means for identifying a band identifier indicating the tracking band, the band identifier in each of a plurality of the tracking bands of different models, and the transmission data from each of the tracking bands, and the transmission data received from the tracking band includes a life log including at least one of vital data or location data of a monitoring target wearing the tracking band having been acquired by the tracking band, and the transmission data received from the server includes a control signal for controlling the tracking band having been determined by the server, and the identification means identifies, based on the band identifier, which model the tracking band having transmitted the life log is, and the identification means identifies, based on a machine learning model, which data in the tracking band monitoring system the data included in the life log having been received from the tracking band corresponds to.

Here, the server can receive at least one of the vital data or the location data of the monitoring target by the relay means for receiving the transmission data from the tracking band and the server and transmitting respective data to the server and the tracking band, and the tracking band can receive the control signal for controlling the tracking band.

Further, the transmission data received from the server includes the control signal for controlling the tracking band having been determined by the server, so that a plurality of tracking bands can be unitarily and remotely controlled.

Further, the identification means for identifying the band identifier indicating the tracking band, the band identifier in each of the plurality of tracking bands of different models, and the transmission data from each of the tracking bands identifies, based on the band identifier, which model the tracking band having transmitted the life log is, and identifies, based on the machine learning model, which data in the tracking band monitoring system the data included in the life log having been received from the tracking band corresponds to, so that data shaping according to the model of the tracking band worn by the monitoring target becomes possible even when the monitoring target replaces the tracking band.

Further, by such an identification means, at least one of the vital data or the location data of the monitoring targets having been received from the plurality of tracking bands can be identified for each tracking band, that is, each monitoring target.

In a preferred embodiment of the tracking band monitoring system of the present invention, the relay means detects the tracking band via a wireless network, performs positioning of the tracking band by interconnection via the wireless network, determines the location data of the tracking band based on the result of the positioning, and transmits the location data to the server. With such a configuration, even when a GPS function of the tracking band is turned off in order to suppress the power consumption of the tracking band, it becomes easy to grasp the position of the tracking band, so that the present invention can realize suitable tracking band monitoring.

In a preferred embodiment of the tracking band monitoring system of the present invention, the relay means receives the life log, which is the transmission data from the tracking band, performs data shaping of at least a part of the life log based on a predetermined data format, and transmits the life log to the server. With such a configuration, the present invention can realize such suitable tracking band monitoring that life logs based on a predetermined data format can be aggregated on the server regardless of the hardware configuration and the program configuration of a wide variety of tracking bands.

A preferred embodiment of the tracking band monitoring system of the present invention further includes a tracking band including a detection device that acquires a life log including the vital data and the location data, and a server, wherein the tracking band has a detection means for acquiring the life log and transmitting the life log and a band status at least indicating a battery remaining amount of the tracking band to the relay device via a wireless network, and the server has a management means for associating a tracking area corresponding to the monitoring target, a monitoring target identifier indicating the monitoring target, and a band identifier indicating the tracking band and determining monitoring data based on the life log and the band status having been transmitted by the relay means, a display means for displaying a management screen corresponding to the band identifier based on at least a part of the monitoring data, and a control means for determining a control signal for controlling the tracking band based on an input operation to the management screen, transmitting the control signal to the tracking band via the relay device, and causing the tracking band to execute the control signal, and the identification means identifies, based on a machine learning model, which vital data and location data in the tracking band monitoring system the vital data and the location data included in the life log having been received from the tracking band correspond to.

By the detection means for acquiring the life log including the vital data and the location data and transmitting the life log and the band status at least indicating the battery remaining amount of the tracking band to the relay device via the wireless network and the management means for associating the tracking area corresponding to the monitoring target, the monitoring target identifier indicating the monitoring target, and the band identifier indicating the tracking band and determining the monitoring data based on the life log and the band status having been transmitted by the relay means, the condition of the monitoring target and the place of the monitoring target can be monitored by the server, and also the monitoring target can be monitored with each monitoring target associated with the tracking area and the life log, and furthermore, the status of the tracking band can also be monitored.

Further, by the display means for displaying the management screen corresponding to the band identifier based on at least a part of the monitoring data, the monitoring person can grasp the monitoring data of each monitoring target through the screen.

Further, the status of the tracking band can be grasped by the detection means for transmitting the band status to the relay device and the management means for determining the monitoring data based on the band status, so that the cause can be easily identified when the monitoring is delayed.

Further, a plurality of tracking bands can be unitarily and remotely controlled by the control means for determining a control signal for controlling the tracking band based on an input operation to the management screen, transmitting the control signal to the tracking band via the relay device, and causing the tracking band to execute the control signal.

Further, the identification means identifies, based on the machine learning model, which vital data and location data in the tracking band monitoring system the vital data and the location data included in the life log having been received from the tracking band correspond to, whereby data shaping according to the model of the tracking band worn by the monitoring target becomes possible even when the monitoring target replaces the tracking band.

Further, both the vital data and the location data are used by such an identification means, so that, for example, when the monitoring target is in a dangerous situation, the monitoring person or the like can move to a place where the monitoring target is present to rescue the monitoring target.

In a preferred embodiment of the tracking band monitoring system of the present invention, the server transmits an email notifying an occurrence of wandering to the relay device having the relay means and the identification means on condition that the location data indicates the outside area of the tracking area. With such a configuration, the present invention makes it possible to request a search by a person who has a relay device located in the vicinity of the monitoring target and can realize such suitable tracking band monitoring that realizes prompt protection when wandering or the like of the monitoring target occurs.

In a preferred embodiment of the tracking band monitoring system of the present invention, the server further has a warning means for issuing, on the management screen in cooperation with the display means, an alert for a monitoring person for calling attention to an abnormality related to the monitoring target on condition that the location data indicates the outside area of the tracking area, and the management means determines a tracking area corresponding to the band identifier. With such a configuration, the present invention can realize such suitable tracking band monitoring that realizes an operation form in which wandering or the like of the monitoring target is immediately handled.

In a preferred embodiment of the tracking band monitoring system of the present invention, the display means displays an emergency contact code image corresponding to the tracking band on the management screen corresponding to the tracking band when the battery remaining amount is substantially zero, and a terminal connected to the server reads the emergency contact code image by using an image sensor, acquires the band identifier associated with the emergency contact code image by succeeding in the reading, and transmits a reading result, which is a result of the reading, including the band identifier to the server, and the reading is a condition for causing a predetermined call center to perform a notification to a predetermined telephone number and/or email address corresponding to the band identifier.

With such a configuration, the present invention can realize such suitable tracking band monitoring that can handle an unexpected situation in monitoring and protection of the monitoring target via the tracking band. The unexpected situation refers to battery depletion or the like of the tracking band.

In a preferred embodiment of the tracking band monitoring system of the present invention, the control means causes the tracking band to execute the control signal, controls at least one of a vibrator, a sound device, and a display device included in the tracking band, and issues an alert for the monitoring target. With such a configuration, the present invention can realize such suitable tracking band monitoring that issues a power-saving alert and notification for the monitoring target by control via the relay device.

In a preferred embodiment of the tracking band monitoring system of the present invention, the control means determines an acquisition schedule of the life log acquired by the detection means by causing the tracking band to execute the control signal. With such a configuration, the present invention can manage and adjust the power consumption of the tracking band in the life log acquisition, so that the present invention can realize such a suitable tracking band monitoring system that can extend the operation period of the tracking band.

In a preferred embodiment of the tracking band monitoring system of the present invention, the management means associates the location data indicating that the monitoring target is located outside the tracking area with the monitoring data as a wandering route. With such a configuration, the present invention can suitably manage the wandering route of the monitoring target and suitably protect the monitoring target.

Further, in order to solve the foregoing problem, the present invention is a tracking band monitoring method of executing a tracking band monitoring system including a relay device that relays communication between a tracking band and a server, including causing a processor of the relay device that relays communication between the tracking band and the server to execute a relay step of receiving transmission data from the tracking band and the server and transmitting respective data to the server and the tracking band, causing the processor of the relay device to further execute a step of identifying, based on a band identifier indicating the tracking band, which model the tracking band having transmitted a life log including at least one of vital data or location data of a monitoring target wearing the tracking band is, and causing the processor of the relay device to further execute a step of identifying, based on a machine learning model, which data in the tracking band monitoring system the data included in the life log having been received from the tracking band corresponds to.

Here, by causing the processor of the relay device that relays communication between the tracking band and the server to execute the relay step of receiving the transmission data from the tracking band and the server and transmitting respective data to the server and the tracking band, the server can receive at least one of the vital data or the location data of the monitoring target and the tracking band can receive a control signal for controlling the tracking band.

Further, by causing the processor of the relay device to further execute the step of identifying, based on the band identifier indicating the tracking band, which model the tracking band having transmitted the life log including at least one of the vital data or the location data of the monitoring target wearing the tracking band is and causing the processor of the relay device to further execute the step of identifying, based on the machine learning model, which data in the tracking band monitoring system the data included in the life log having been received from the tracking band corresponds to, data shaping according to the model of the tracking band worn by the monitoring target becomes possible even when the monitoring target replaces the tracking band.

Further, by causing the processor of the relay device to execute the identification steps as described above, at least one of the vital data or the location data of the monitoring targets having been received from a plurality of tracking bands can be identified for each tracking band, that is, each monitoring target.

In a preferred embodiment of the tracking band monitoring method of the present invention, a detection step of acquiring a life log including the vital data and the location data and transmitting the life log and a band status at least indicating a battery remaining amount of the tracking band to the relay device via a wireless network is executed by a processor of the tracking band including a detection device that acquires the life log, and a management step of associating a monitoring target identifier of the monitoring target and a band identifier of the tracking band and determining monitoring data based on the life log and the band status having been transmitted by the relay step, a display step of displaying a management screen based on at least a part of the monitoring data, and a control step of determining a control signal for controlling the tracking band based on an input operation to the management screen, transmitting the control signal to the tracking band via the relay device and the wireless network, and causing the tracking band to execute the control signal are executed by a processor of the server, and a step of identifying, based on a machine learning model, which vital data and location data in the tracking band monitoring system the vital data and the location data included in the life log having been received from the tracking band correspond to is further executed by the processor of the relay device.

By causing the processor of the tracking band including the detection device that acquires the life log to execute the detection step of acquiring the life log including the vital data and the location data and transmitting the life log and the band status at least indicating the battery remaining amount of the tracking band to the relay device via the wireless network, and by causing the processor of the server to execute the management step of associating the monitoring target identifier of the monitoring target and the band identifier of the tracking band and determining the monitoring data based on the life log and the band status having been transmitted by the relay step, the condition of the monitoring target and the place of the monitoring target can be monitored by the server, and also the monitoring target can be monitored with each monitoring target associated with the tracking area and the life log, and furthermore, the status of the tracking band can also be monitored.

Further, by causing the processor of the server to execute the display step of displaying the management screen based on at least a part of the monitoring data, the monitoring person can grasp the monitoring data of each monitoring target through the screen.

Further, by causing the processor of the server to execute the control step of determining a control signal for controlling the tracking band based on an input operation to the management screen, transmitting the control signal to the tracking band via the relay device and the wireless network, and causing the tracking band to execute the control signal, a plurality of tracking bands can be unitarily and remotely controlled.

Further, by causing the processor of the relay device to further execute the step of identifying, based on the machine learning model, which vital data and location data in the tracking band monitoring system the vital data and the location data included in the life log having been received from the tracking band correspond to, data shaping according to the model of the tracking band worn by the monitoring target becomes possible even when the monitoring target replaces the tracking band.

Further, by causing the processor of the relay device to execute the identification step as described above, both the vital data and the location data are used, so that, for example when the monitoring target is in a dangerous situation, the monitoring person or the like can move to a place where the monitoring target is present to rescue the monitoring target.

Further, in order to solve the foregoing problem, the present invention is a non-transitory computer-readable storage medium storing a tracking band monitoring program for executing a tracking band monitoring system including a relay device that relays communication between a tracking band and a server, the program causing the relay device to function as a relay means for receiving transmission data from the server and the tracking band and transmitting respective data to the server and the tracking band, causing the relay device to function as a means for identifying, based on a band identifier indicating the tracking band, which model the tracking band having transmitted a life log including at least one of vital data or location data of a monitoring target wearing the tracking band is, and causing the relay device to function as a means for identifying, based on a machine learning model, which data in the tracking band monitoring system the data included in the life log having been received from the tracking band corresponds to.

Here, by causing the relay device to function as the relay means for receiving the transmission data from the server and the tracking band and transmitting respective data to the server and the tracking band, the server can receive at least one of the vital data or the location data of the monitoring target and the tracking band can receive a control signal for controlling the tracking band.

Further, by causing the relay device to function as the means for identifying, based on the band identifier indicating the tracking band, which model the tracking band having transmitted the life log including at least one of the vital data or the location data of the monitoring target wearing the tracking band is and causing the relay device to function as the means for identifying, based on the machine learning model, which data in the tracking band monitoring system the data included in the life log having been received from the tracking band corresponds to, data shaping according to the model of the tracking band worn by the monitoring target becomes possible even when the monitoring target replaces the tracking band.

Further, by causing the relay device to function as the identification means as described above, at least one of the vital data or the location data of the monitoring targets having been received from a plurality of tracking bands can be identified for each tracking band, that is, each monitoring target.

In a preferred embodiment of the non-transitory computer-readable storage medium of the present invention, the tracking band including a detection device that acquires a life log including the vital data and the location data is caused to function as a detection means for acquiring the life log and transmitting the life log and a band status at least indicating a battery remaining amount of the tracking band to the relay device via a wireless network, and the server is caused to function as a management means for associating a monitoring target identifier of the monitoring target and a band identifier of the tracking band and determining monitoring data based on the life log and the band status having been transmitted by the relay means, a display means for displaying a management screen based on at least a part of the monitoring data, and a control means for determining a control signal for controlling the tracking band based on an input operation to the management screen, transmitting the control signal to the tracking band via the relay device and the wireless network, and causing the tracking band to execute the control signal, and the relay device is caused to function as a means for identifying, based on a machine learning model, which vital data and location data in the tracking band monitoring system the vital data and the location data included in the life log having been received from the tracking band correspond to.

By causing the tracking band including the detection device that acquires the life log including the vital data and the location data to function as the detection means for acquiring the life log and transmitting the life log and the band status at least indicating the battery remaining amount of the tracking band to the relay device via the wireless network, and by causing the server to function as the management means for associating the monitoring target identifier of the monitoring target and the band identifier of the tracking band and determining the monitoring data based on the life log and the band status having been transmitted by the relay means, the condition of the monitoring target and the place of the monitoring target can be monitored by the server, and also the monitoring target can be monitored with each monitoring target associated with the tracking area and the life log, and furthermore, the status of the tracking band can also be monitored.

Further, by causing the server to function as the display means for displaying the management screen based on at least a part of the monitoring data, the monitoring person can grasp the monitoring data of each monitoring target through the screen.

Further, by causing the server to function as the control means for determining a control signal for controlling the tracking band based on an input operation to the management screen, transmitting the control signal to the tracking band via the relay device and the wireless network, and causing the tracking band to execute the control signal, a plurality of tracking bands can be unitarily and remotely controlled.

Further, by causing the relay device to function as the means for identifying, based on the machine learning model, which vital data and location data in the tracking band monitoring system the vital data and the location data included in the life log having been received from the tracking band correspond to, data shaping according to the model of the tracking band worn by the monitoring target becomes possible even when the monitoring target replaces the tracking band.

Further, by causing the relay device to function as the identification means as described above, both the vital data and the location data are used, so that, for example when the monitoring target is in a dangerous situation, the monitoring person or the like can move to a place where the monitoring target is present to rescue the monitoring target.

In order to solve the foregoing problem, the present invention is a tracking band monitoring system including a tracking band including a detection device that acquires a life log including vital data and location data of a monitoring target wearing the tracking band, a server, and a relay device that relays communication between the tracking band and the server, wherein the tracking band has a detection means for acquiring the life log and transmitting the life log and a band status at least indicating a battery remaining amount of the tracking band to the relay device via a wireless network, and the relay device has a relay means for receiving transmission data from the tracking band and the server and transmitting respective data to the server and the tracking band, and the server has a management means for associating a monitoring target identifier indicating the monitoring target and a band identifier indicating the tracking band and determining monitoring data based on the life log and the band status having been transmitted by the relay means, a display means for displaying a management screen corresponding to the band identifier based on at least a part of the monitoring data, and a control means for determining a control signal for controlling the tracking band based on an intention input via the management screen, transmitting the control signal to the tracking band via the relay device, and causing the tracking band to execute the control signal.

In a preferred embodiment of the present invention, the relay device further includes an identification means for identifying the band identifier in each of a plurality of the tracking bands of different models and the transmission data from each of the tracking bands, and the identification means identifies, based on the band identifier indicating the tracking band, which model the tracking band having transmitted the life log is, and also identifies, based on a machine learning model, which data in the tracking band monitoring system the data included in the life log having been received from the tracking band corresponds to. With such a configuration, the present invention can realize such suitable tracking band monitoring that data shaping according to the model of the tracking band worn by the monitoring target becomes possible even when the monitoring target replaces the tracking band.

In a preferred embodiment of the present invention, the display means displays an emergency contact code image corresponding to the tracking band on the management screen corresponding to the tracking band when the battery remaining amount is substantially zero, and reading of the emergency contact code image is a condition for causing a predetermined call center to perform a notification to a predetermined telephone number and/or email address corresponding to the band identifier. With such a configuration, the present invention can realize such suitable tracking band monitoring that can handle an unexpected situation in monitoring and protection of the monitoring target via the tracking band. The unexpected situation refers to battery depletion or the like of the tracking band.

In order to solve the foregoing problem, the present invention is a tracking band monitoring device, being a relay device that relays communication between a tracking band and a server, having a relay means for receiving transmission data from the tracking band and the server and transmitting respective data to the server and the tracking band, wherein the transmission data received from the tracking band includes a life log including location data and vital data of a monitoring target wearing the tracking band having been acquired by the tracking band and a band status at least indicating a battery remaining amount of the tracking band, and the transmission data received from the server includes a control signal for controlling the tracking band having been determined by the server.

In order to solve the foregoing problem, the present invention is a tracking band monitoring method including causing a processor of a tracking band including a detection device that acquires a life log including vital data and location data of a monitoring target wearing the tracking band to execute a detection step of acquiring the life log and transmitting the life log and a band status at least indicating a battery remaining amount of the tracking band to a relay device via a wireless network, causing a processor of the relay device that relays communication between the tracking band and a server to execute a relay step of receiving transmission data from the tracking band and the server and transmitting respective data to the server and the tracking band, and causing a processor of the server to execute a management step of associating a monitoring target identifier of the monitoring target and a band identifier of the tracking band and determining monitoring data based on the life log and the band status having been transmitted by the relay step, a display step of displaying a management screen based on at least a part of the monitoring data, and a control step of determining a control signal for controlling the tracking band based on an intention input via the management screen, transmitting the control signal to the tracking band via the relay device and the wireless network, and causing the tracking band to execute the control signal.

In order to solve the foregoing problem, the present invention is a non-transitory computer-readable storage medium storing a tracking band monitoring program including causing a tracking band including a detection device that acquires a life log including vital data and location data of a monitoring target wearing the tracking band to function as a detection means for acquiring the life log and transmitting the life log and a band status at least indicating a battery remaining amount of the tracking band to a relay device via a wireless network, causing the relay device to function as a relay means for receiving transmission data from a server and the tracking band and transmitting respective data to the server and the tracking band, and causing the server to function as a management means for associating a monitoring target identifier of the monitoring target and a band identifier of the tracking band and determining monitoring data based on the life log and the band status having been transmitted by the relay means, a display means for displaying a management screen based on at least a part of the monitoring data, and a control means for determining a control signal for controlling the tracking band based on an intention input via the management screen, transmitting the control signal to the tracking band via the relay device and the wireless network, and causing the tracking band to execute the control signal.

Advantageous Effects of the Invention

The present invention can provide a novel technique for realizing suitable tracking band monitoring.

DESCRIPTION OF THE EMBODIMENTS

Embodiment 1

This description describes the configuration, the operation and effect, etc., according to an embodiment of the present invention with reference to the drawings. The present invention is not limited to the following embodiment and various configurations can be adopted.

A tracking band monitoring system, a tracking band monitoring method, a tracking band monitoring program, and a tracking band monitoring program medium according to the present invention each exhibit the same operation and effect. Further, the operation and effect of a tracking band monitoring device and a program and a program medium according to the tracking band monitoring device is included in the operation and effect of the tracking band monitoring system.

The tracking band monitoring program medium according to the present invention is a recording medium in which the tracking band monitoring program is stored, and is a non-transitory recording medium such as a flash memory. Further, the same applies to the program medium according to the tracking band monitoring device.

<Functional Block>

Figure 1:
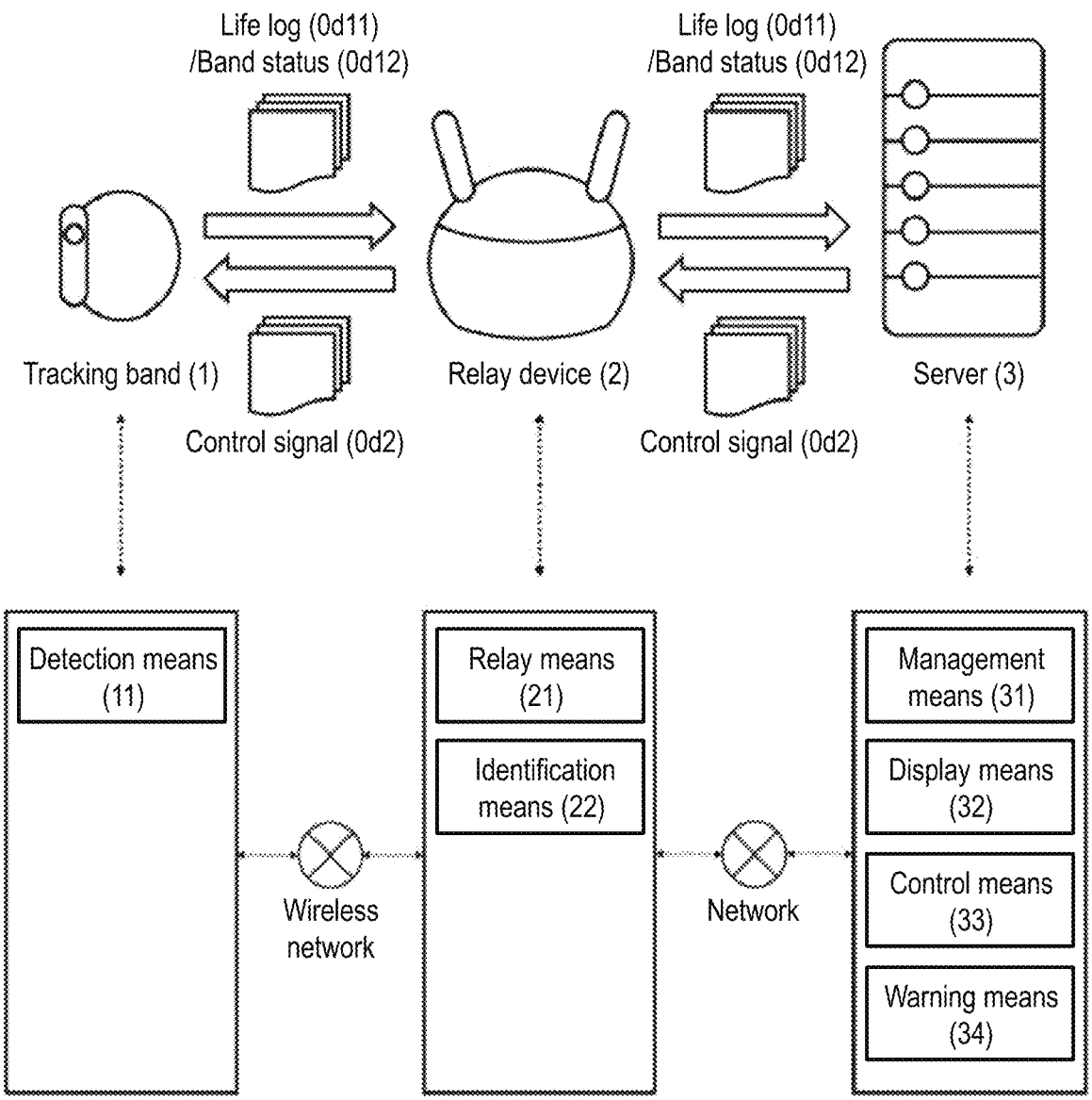
FIG. 1 shows a functional block diagram according to Embodiment 1 of the present invention.

As illustrated in FIG. 1, a tracking band monitoring system 0 in Embodiment 1 has a tracking band 1 including a detection device that acquires a life log 0*d*11 including vital data indicating a known vital sign of a monitoring target wearing the tracking band 1 and conventional location data indicating position coordinates, a movement path, and a positioning result of the tracking band 1, a server 3, and a relay device 2 that relays communication between the tracking band 1 and the server 3. There is no limit to the number of each of the tracking band 1, the relay device 2, and the server 3 according to one embodiment.

The tracking band 1 has a detection means 11 (detection step) for acquiring the life log 0*d*11 and transmitting the life log 0*d*11 and a band status 0*d*12 at least indicating a battery remaining amount of the tracking band 1 to the relay device 2 via a wireless network.

The detection means 11 may be configured to perform or contribute to acquisition of the location data based on a known or conventional method excluding the GPS, based on communication with a base station, and based on the three-point positioning method, when the position of the tracking band 1 does not deviate from a tracking area 0*a*.

The tracking band 1 according to one embodiment of the present invention may determine the presence or absence of a tumble or a fall by tracking the acceleration of the monitoring target wearing the tracking band 1 and measuring a change in the position and the action of the body based on an acceleration sensor. The determination result of the presence or absence of a tumble based on the acceleration sensor may be transmitted to the server 3 by a relay means 21, and the relay device 2 may be configured to issue an alert directed to the monitoring target and/or a monitoring person according to the determination result.

The tracking band 1 according to one embodiment of the present invention may estimate the number of steps, the step length, and the traveling direction of the monitoring target wearing the tracking band 1 based on the acceleration sensor and a geomagnetic sensor and cumulatively infer position information of the monitoring target from coordinates that are the base point. The coordinates that are the base point may be a point where radio waves from GPS satellites are out of reach. The determination result of the position information based on the acceleration sensor and the geomagnetic sensor may be transmitted to the server 3 by the relay means 21, and the relay device 2 may be configured to issue an alert directed to the monitoring target and/or the monitoring person according to the determination result.

The "vital data" in the description herein includes, as an example, at least one of body temperature data, sleep data, pulse data, data of the number of steps, blood pressure data, blood oxygen data, electrocardiogram data, band attachment/detachment determination data, tumble determination data, and calorie consumption data, and the numerical value indicates conventional numerical data such as a minimum value, a maximum value, a mode value, an average value, a deviation, and a binary value during a predetermined period.

The tracking band 1 is, as an example, a wearable device that can be installed by a known or conventional method such as being attached to, wrapped around, or adhered to a constituent region such as a wrist or a leg of the monitoring target.

The "monitoring target" in the description herein may be, as an example, a human such as an elderly person, may be an animal such as a dog or a cat, and may be a robot such as a drone.

The relay device 2 has a relay means 21 (relay step) for receiving transmission data from the tracking band 1 and the server 3 and transmitting respective data to the server 3 and the tracking band 1 and an identification means 22 (identification step) for identifying a band identifier in each of a plurality of tracking bands 1 of different models and the transmission data from each of the tracking bands 1.

The relay device 2 is a beacon terminal as an example. Further, the relay device 2 interconnects with the tracking band 1 via the wireless network. Further, the relay device 2 is interconnected with the server 3 via a network.

Further, the relay device 2 may determine that wandering or the like of the monitoring target has occurred when a reconnection is not made by a preset time or a reconnection is not made during a predetermined time after the interconnection with the tracking band 1 is cut off.

The "wireless network" in the description herein is based on a known or conventional communication method and frequency band such as Bluetooth (registered trademark) or LoRaWAN (registered trademark).

In a conventional indoor positioning mode, the relay means 21 detects the tracking band 1 via the wireless network, performs positioning of the tracking band 1 by the interconnection via the wireless network, and transmits location data of the tracking band 1 to the server 3 based on the position coordinates of the relay device 2 and the result of the positioning. Transmission and reception to and from the tracking band 1 or the server 3 by the relay means 21 may be encrypted based on a known or conventional method. The transmission and reception may be based on a VPN as an example.

The relay means 21 receives the life log 0*d*11, which is transmission data from the tracking band 1, performs data shaping of at least a part of the life log 0*d*11 based on a predetermined data format, and transmits the life log 0*d*11 to the server 3. The data shaping is based on a known or conventional method and there are no restrictions on the mode of the data format.

The relay means 21 receives a control signal 0*d*2, which is transmission data from the server 3, performs data shaping of at least a part of the control signal 0*d*2 based on a predetermined data format, and transmits the control signal 0*d*2 to the tracking band 1. The data shaping is based on a known or conventional method and there are no restrictions on the mode of the data format, which is determined according to the hardware configuration and the program configuration of the tracking band 1.

The identification means 22 identifies, based on the band identifier indicating the tracking band 1, which model the tracking band 1 having transmitted the life log 0*d*11 is, and identifies, based on a machine learning model, which data in the tracking band monitoring system 0 the data included in the life log 0*d*11 having been received from the tracking band 1 corresponds to. Teacher data of the machine learning is a combination of model information included in the band identifier of the tracking band 1 and the data of the life log 0*d*11. Here, in one embodiment of the present invention, the input data in the machine learning is the life log 0*d*11 and the output data is the model information. Further, the model information in the present invention is information indicating which model among known or conventional tracking bands 1 the tracking band 1 is. Further, for the identification of the data included in the life log 0*d*11, as an example, a machine learning model using a neural network or the like may be used.

The identification means 22 may determine that the tracking band 1 worn by the monitoring target has been replaced based on a change in the band identifier such as a MAC address managed by the tracking band 1.

The relay device 2 according to one embodiment of the present invention may determine the location of the monitoring target by determining the presence or absence of a heat source indicating the monitoring target based on an infrared sensor. The determination result of the location of the monitoring target based on the infrared sensor may be transmitted to the server 3 by the relay means 21 and may be used for determining monitoring data 0*d*3.

The relay device 2 according to one embodiment of the present invention may determine the moving speed and the amount of displacement of the monitoring target based on a Doppler radar using an infrared sensor. The determination result of the moving speed and the amount of displacement of the monitoring target based on the Doppler radar may be transmitted to the server 3 by the relay means 21 and may be used for determining the monitoring data 0*d*3.

The relay device 2 according to one embodiment of the present invention may determine the risk of heat stroke at an installation point of the relay device 2 by measuring the temperature and the humidity at the installation point based on a temperature sensor and a humidity sensor. The determination of the risk of heat stroke may be a stepwise determination based on the WBGT or may be a determination of being dangerous when the value of the WBGT exceeds a predetermined value. The determination result of the risk of heat stroke based on the temperature sensor and the humidity sensor may be transmitted to the server 3 by the relay means 21, and the relay device 2 may be configured to issue an alert directed to the monitoring target and/or the monitoring person according to the determination result.

The relay device 2 according to one embodiment of the present invention may be configured to issue an alert such as voice transmission or timer notification for preventing the monitoring target from forgetting to take medicine, or the like. The setting or the like including the timing and contents of the alert may be configured to be determined and stored by a management means 31 as a part of the monitoring data 0*d*3.

The relay device 2 according to one embodiment of the present invention may receive a detection result as to whether a cover of a medicine case, which is a peripheral device of the tracking band monitoring system 0, has been opened or closed. The medicine case may be configured to detect that the cover has been opened or closed and transmit the detection result by a sensor and a communication device installed, and the detection result having been transmitted to the relay device 2 via the wireless network may be transmitted to the server 3 by the relay means 21. Further, the server 3 may determine that the monitoring target has taken medicine on condition that the server 3 receives the detection result. At that time, the server 3 may use only the fact that the cover of the medicine case has been opened or closed as a criterion of the determination. Further, the server 3 may stop the alert for preventing the monitoring target from forgetting to take medicine on condition that the server 3 determines that the monitoring target has taken medicine.

The server 3 has a management means 31 (management step) for associating a monitoring target identifier indicating the monitoring target and the band identifier and determining the monitoring data 0*d*3 based on the life log 0*d*11 and the band status 0*d*12 having been transmitted by the relay means 21, a display means 32 (display step) for displaying a management screen 0*w* corresponding to the band identifier based on at least a part of the monitoring data 0*d*3, and a control means 33 (control step) for determining a control signal 0*d*2 for controlling the tracking band 1 based on an intention input via the management screen 0*w*, transmitting the control signal 0*d*2 to the tracking band 1 via the relay device 2, and causing the tracking band 1 to execute the control signal 0*d*2.

The server 3 may store, in a database, at least a part of various data used in each means and each step included in the server 3. The database is a database based on a known or conventional method and configuration and may be an RDB or a KVS.

The management means 31 may associate the monitoring target identifier and the band identifier and perform an initial setting and a registration of the tracking band 1 on condition that the battery remaining amount of the tracking band 1 is equal to or more than a predetermined amount. The predetermined amount refers to, as an example, a battery remaining amount indicating that the battery runtime is 30 days or more.

The management means 31 may record the update time of the monitoring data 0*d*3 while associating the update time with the band identifier, and monitor the elapsed time from the last update time.

The server 3 further has a warning means 34 (warning step) for issuing, on the management screen 0*w* in cooperation with the display means 32, an alert for the monitoring person for calling attention to an abnormality related to the monitoring target based on at least a part of the monitoring data 0*d*3.

The "alert" such as the alert for the monitoring person and an after-mentioned alert for the monitoring target in the description herein refers to a notification based on a known or conventional output device included in a computer device such as the tracking band 1, the relay device 2, or the server 3. The notification is directed to the monitoring person and the monitoring target using the computer device based on at least one of visual, audible, and tactile expressions.

A condition for an alert to be issued directed to the monitoring person and the monitoring target includes that an SOS button of the tracking band 1 is pressed, it is determined that there is a risk of heat stroke at the installation point of the relay device 2, the setting time of the alert for preventing forgetting to take medicine comes, the vital data of the monitoring target deviates from the vital normal range, the server 3 receives information transmission by the nationwide instantaneous alert system (hereinafter, referred to as a J-ALERT), and the monitoring target goes out of the tracking area 0a.

Further, the manner of the notification based on the known or conventional output device included in the computer device such as the tracking band 1, the relay device 2, or the server 3 may be changed depending on which condition the alert is issued. For example, when the setting time of an alert for preventing forgetting to take medicine comes, a voice transmission is made to inform that it is time to take medicine, and when a J-ALERT is received, such a warning sound that fuels a sense of crisis of the monitoring person and the monitoring target is made.

The management means 31 determines the tracking area 0a corresponding to the band identifier and the warning means 34 issues an alert for the monitoring person on condition that the location data indicates the outside area of the tracking area 0a. The warning means 34 may issue the alert for the monitoring person on condition that the location data indicates being located in a predetermined area instead of or in addition to the fact that the location data indicates the outside area of the tracking area 0a.

The management means 31 associates the location data indicating a movement path or the like indicating that the monitoring target is located outside the tracking area 0a with the monitoring data 0d3 as a wandering route. At this time, the wandering route may be associated with the monitoring data 0d3 at every predetermined time such as every day or may be associated with the monitoring data 0d3 every time the monitoring target returns to the tracking area 0a again after deviating from the tracking area 0a.

The "tracking area 0a" in the description herein may refer to a predetermined area such as a city, a town, or a village and may refer to a range concentric around predetermined position coordinates. The tracking area 0a may refer to predetermined areas such as a plurality of cities, towns, or villages.

"Indicating the outside area" in the description herein may indicate that at least a part of the position coordinates or the movement path deviates from the predetermined area such as the tracking area 0a and may indicate that at least a part of the position coordinates or the movement path deviates from the predetermined area such as the tracking area 0a for a predetermined time.

The management means 31 determines a vital normal range corresponding to the band identifier and the warning means 34 issues an alert for the monitoring person on condition that the vital data deviates from the vital normal range. The "vital normal range" in the description herein is determined by the management means 31 based on the intention input of the monitoring person and indicates, as an example, a dangerous blood pressure value or the like. The vital normal range may be individually determined for each of the monitoring target identifiers.

The display means 32 displays an emergency contact code image 0w5 corresponding to the tracking band 1 on the management screen 0w corresponding to the tracking band 1, and the reading of the emergency contact code image 0w5 by a terminal which is a known or conventional computer is a condition for causing a predetermined call center to perform a notification to a predetermined telephone number and/or email address corresponding to the band identifier. Specifically, with the reading of the emergency contact code image 0w5 as a trigger, a notification to the server or the like by the predetermined call center is performed, and with the notification as a trigger, a notification by the predetermined call center is performed. The telephone number includes a home telephone number or a mobile telephone number of the monitoring target, a home telephone number or a mobile telephone number of a family member or a relative of the monitoring target, or the like. The email address includes an email address of the monitoring target, an email address of a family member or a relative of the monitoring target, or the like.

The terminal acquires the band identifier of the tracking band 1 corresponding to the emergency contact code image 0w5 by succeeding in the reading and transmits a reading result, which is a result of the reading, including the band identifier, to the server 3. The server 3 requests the predetermined call center to make a notification to the predetermined telephone number and/or email address corresponding to the band identifier on condition that the reading result is received.

In one embodiment of the present invention, with the reading of the emergency contact code image 0w5 as a condition (trigger), first, the call center performs a notification to the telephone number. Next, when the monitoring target does not answer the telephone in the notification to the telephone number, the call center performs a notification to the email address. The "notification" here refers to a notification based on a conventional method such as making a telephone call, sending an email, etc., and aims to confirm safety or the like.

In one embodiment of the present invention, the deviation of the vital data from the vital normal range may be a condition for causing the predetermined call center to perform a notification to the predetermined telephone number and/or email address corresponding to the band identifier.

Further, the deviation of the vital data from the vital normal range may be configured to cause the server 3 or a terminal connected to the server 3 to perform a notification to the predetermined telephone number and/or email address corresponding to the band identifier or a notification to the telephone number and/or email address corresponding to the predetermined call center.

In one embodiment of the present invention, detection of utterance by the monitoring target by the detection device of the relay device 2 may be a condition for causing the predetermined call center to perform a notification to the predetermined telephone number and/or email address corresponding to the band identifier. As an example, the utterance is a general voice that can refer to an abnormality such as "help" or a voice exceeding a predetermined volume.

In one embodiment of the present invention, pressing the SOS button of the tracking band 1 may be a condition for causing the predetermined call center to perform a notification to the predetermined telephone number and/or email address corresponding to the band identifier. Further, the condition for causing the predetermined call center to perform a notification to the predetermined telephone number and/or email address corresponding to the band identifier may be a condition for causing the tracking band 1 and/or the relay device 2 to issue an alert for the monitoring target.

The "emergency contact code image 0w5" in the description herein takes, as an example, the form of a low-dimensional code such as a bar code or a two-dimensional code. The reading is a processing using an image sensor or the like. The terminal is a known or conventional computer device having the image sensor. The low-dimensional code is, as an example, a bar code or a QR code (registered trademark).

The "call center" in the description herein refers to, as an example, a known facility that performs support work related to the monitoring target such as an elderly person.

The display means 32 may display the emergency contact code image 0w5 on the management screen 0w on condition that the band status 0d12 of the tracking band 1 indicates that the battery remaining amount is substantially zero.

The display means 32 may display the emergency contact code image 0w5 on condition that the elapsed time from the last update time of the monitoring data 0d3 has passed a predetermined time instead of or in addition to the battery remaining amount being indicated to be substantially zero.

The display means 32 may be configured not to display the emergency contact code image 0w5 on condition that the band status 0d12 of the tracking band 1 indicates that the battery remaining amount is not substantially zero.

The "battery remaining amount is substantially zero" in the description herein can refer to a situation in which the acquisition of the life log 0d11 by the tracking band 1 is not possible, in addition to the fact that the battery remaining amount is zero.

The control means 33 causes the tracking band 1 to execute the control signal 0d2, controls at least one of a vibrator, a sound device, and a display device included in the tracking band 1, and issues an alert for the monitoring target.

By the tracking band 1 or the relay device 2 detecting another tracking band 1 via the wireless network by approaching another tracking band 1 or the like, the alert for the monitoring target may be issued by another tracking band 1.

The control means 33 may determine the type of data constituting the vital data and/or the location data included in the life log 0d11 acquired by the detection means 11 by causing the tracking band 1 to execute the control signal 0d2 and may determine the acquisition schedule of the vital data and/or the location data.

The control means 33 determines the relay device 2 that is the destination of transmission of the control signal 0d2 based on the monitoring data 0d3.

<Hardware Configuration>

Figure 2:
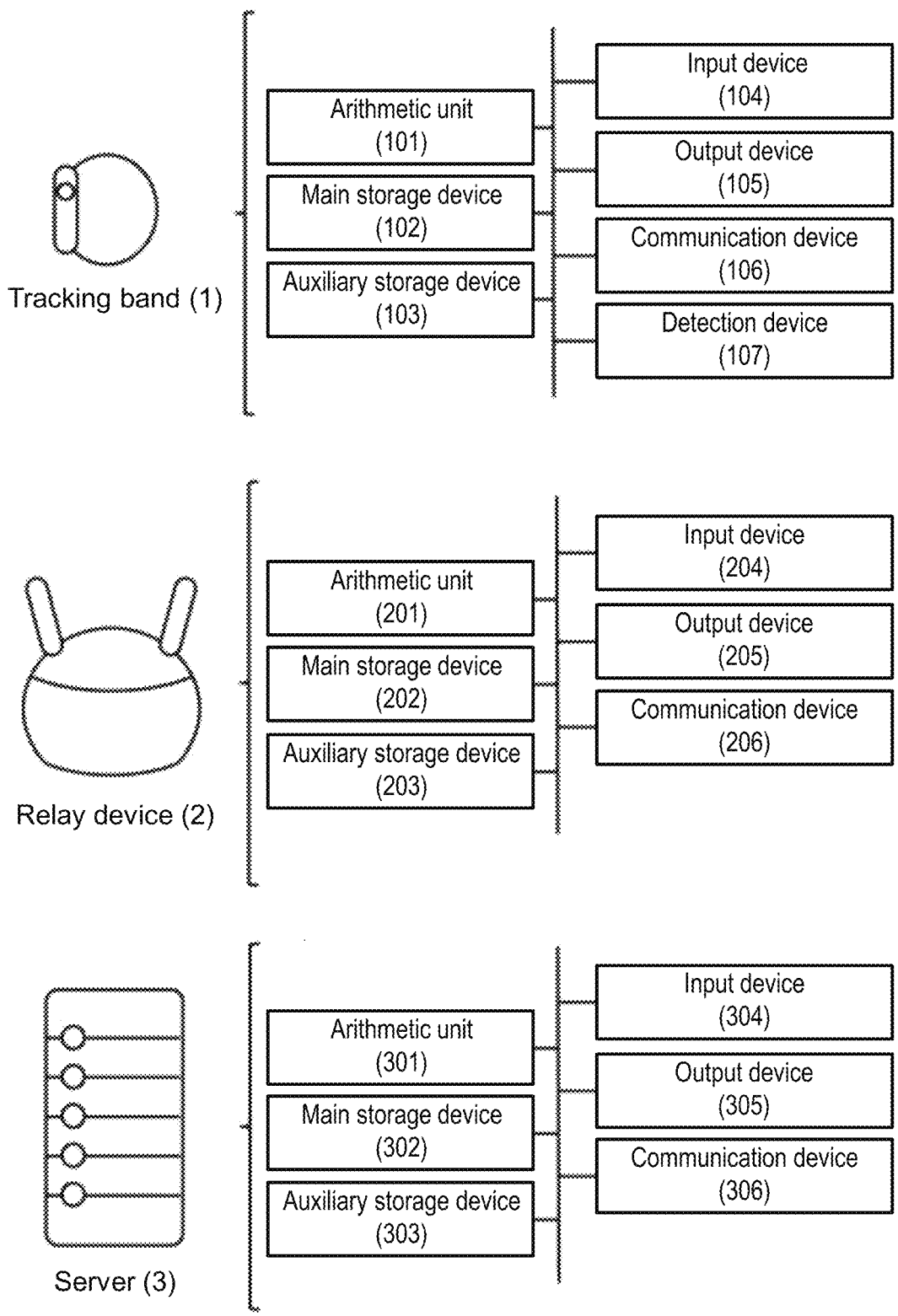
FIG. 2 shows a hardware configuration diagram according to Embodiment 1 of the present invention.

As illustrated in FIG. 2, the tracking band 1 has an arithmetic unit 101, a main storage device 102, an auxiliary storage device 103, an input device 104, an output device 105, a communication device 106, a detection device 107, and a bus interface. Each of these devices is appropriately used in exerting the operation and effect of each means and each step included in the tracking band 1 described above. The detection device 107 is a detection device included in the tracking band 1. The tracking band 1 may be configured to include an SOS button for notifying SOS.

As illustrated in FIG. 2, the relay device 2 has an arithmetic unit 201, a main storage device 202, an auxiliary storage device 203, an input device 204, an output device 205, a communication device 206, and a bus interface. Each of these devices is appropriately used in exerting the operation and effect of each means and each step included in the relay device 2 described above.

The relay device 2 may be configured to include a known or conventional detection device including a microphone, an infrared sensor, a temperature sensor, and a humidity sensor. The relay device 2 is configured to further include a known device such as a camera or a microphone for performing communication between the monitoring target and the monitoring person or a family member or a relative of the monitoring target, etc., via an IP telephone or a video telephone, but the relay device 2 does not have to include the known device such as the camera or the microphone. Further, it may be configured such that the monitoring person or a family member or a relative of the monitoring target, etc., is capable of checking visual and/or audible information at the installation point of the relay device 2 via the camera and/or the microphone or the like provided in the relay device 2 by inputting a preset password.

As illustrated in FIG. 2, the server 3 has an arithmetic unit 301, a main storage device 302, an auxiliary storage device 303, an input device 304, an output device 305, a communication device 306, and a bus interface. Each of these devices is appropriately used in exerting the operation and effect of each means and each step included in the server 3 described above. The auxiliary storage device 303 may function as a hardware resource related to the database described above.

Each of the arithmetic units 101, 201, and 301 has a known processor capable of executing an instruction set. Each of the main storage devices 102, 202, and 302 has a known volatile memory capable of storing an instruction set. Each of the auxiliary storage devices 103, 203, and 303 has a known recording medium capable of recording a program or the like.

Each of the input devices 104, 204, and 304 is a known interface capable of intention input, for example. Each of the output devices 105, 205, and 305 is such a known interface that enables a visual, audible, and tactile notification. Specifically, it is a vibrator, a sound device, a display device, or the like.

The communication devices 106 and 206 are each such a known network interface that enables interconnection between the tracking band 1 and the relay device 2 on the wireless network described above. The communication devices 206 and 306 are each such a known network interface that enables interconnection between the relay device 2 and the server 3. The detection device 107 is such a known sensor or the like that enables acquisition of at least a part of the life log 0d11 described above. The connection between the relay device 2 and the server 3 may be a wireless connection or may be a wired connection.

<Processing Sequence>

Figure 3:
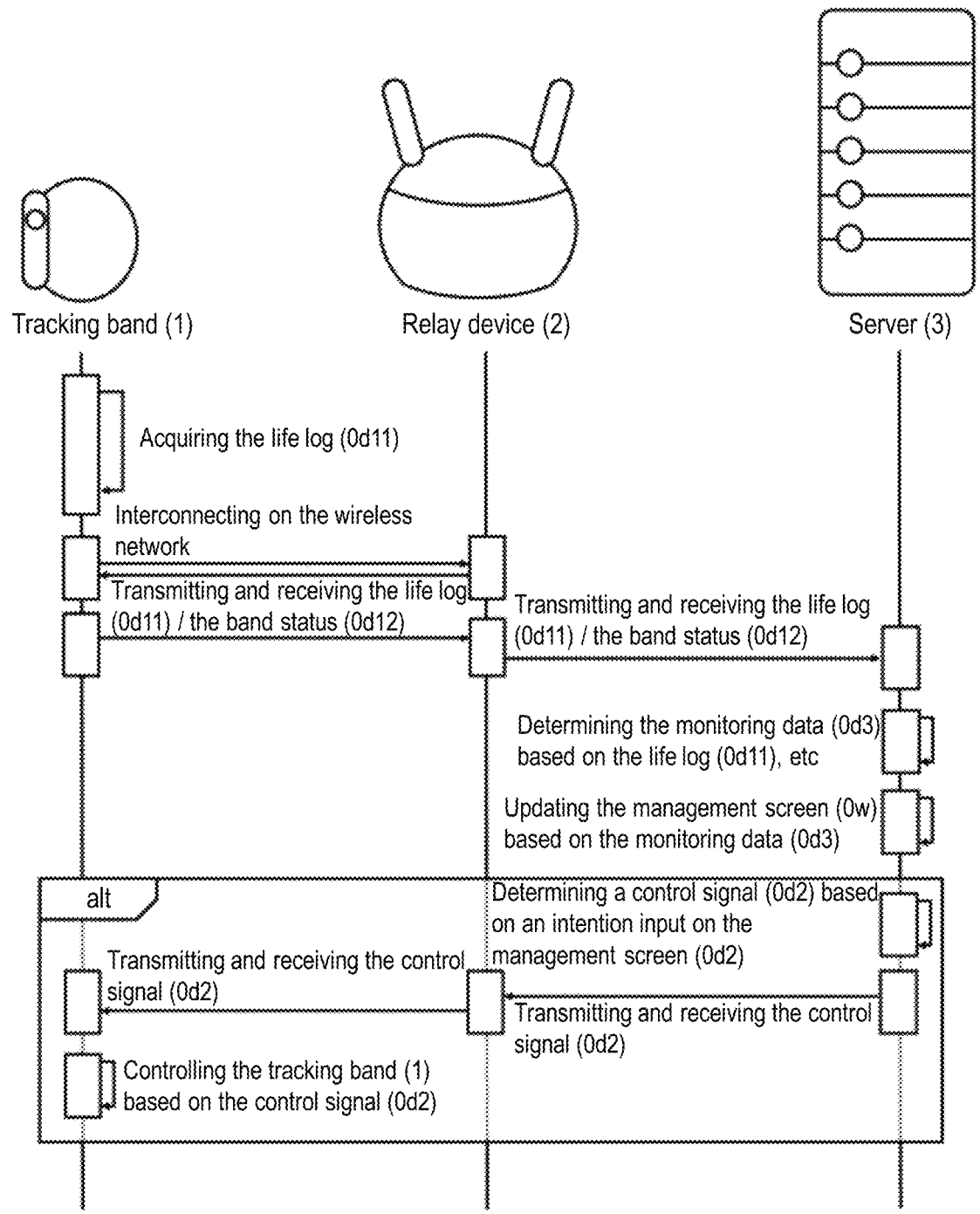
FIG. 3 shows a sequence diagram according to Embodiment 1 of the present invention.

As illustrated in FIG. 3, the tracking band monitoring according to one embodiment of the present invention is performed according to the following procedures. First, the acquisition of the life log 0d11 by the tracking band 1 is performed. Next, the interconnection between the tracking band 1 and the relay device 2 is performed. At this time, the tracking band 1 transmits transmission data including the life log 0d11 and the band status 0d12 to the relay device 2 and the relay device 2 receives the transmission data. After that, the relay device 2 transmits the transmission data to the server 3.

As illustrated in FIG. 3, the server 3 determines the monitoring data 0d3 based on the life log 0d11 and the band status 0d12 having been transmitted from the relay device 2. After that, the server 3 updates the management screen 0w based on the monitoring data 0d3.

As illustrated in FIG. 3, when the tracking band 1 is controlled by the monitoring person, the server 3 first determines the control signal 0d2 based on the intention input on the management screen 0w. After that, the server 3 transmits the control signal 0d2 to the relay device 2. The relay device 2 transmits the control signal 0d2 to the tracking band 1. Finally, the tracking band 1 executes the control signal 0d2.

Figure 4:
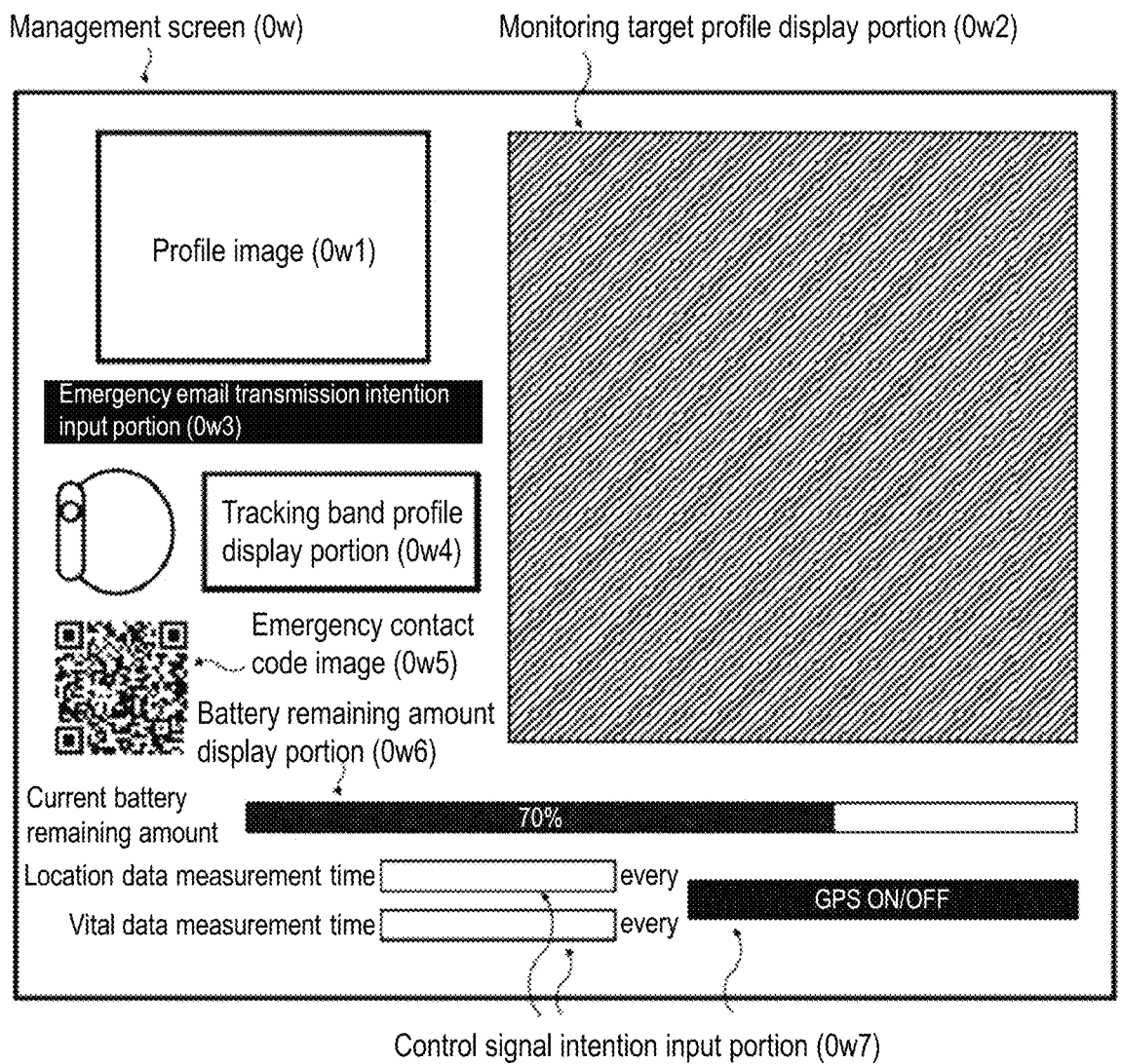
FIG. 4 shows a display example of a management screen according to Embodiment 1 of the present invention.

As illustrated in FIG. 4, the management screen 0w includes a plurality of display portions or the like (display objects). Further, the management screen 0w includes a profile image 0w1 corresponding to the monitoring target identifier, a monitoring target profile display portion 0w2, and an emergency email transmission intention input portion 0w3.

Besides indicating at least a part of the life log 0d11, the monitoring target profile display portion 0w2 may indicate at least one of a family hospital name, a department in charge, a doctor in charge, a body height, a body weight, an average body temperature, a blood type, a blood pressure, a pulse rate, the presence or absence of dementia, the presence or absence of a wandering history, a place frequently visited, an allergy, the presence or absence of a pacemaker, medicine being taken, timing of taking medicine, an X-ray image, a CT image, an MRI image, and an electrocardiogram image, which are all information corresponding to the monitoring target identifier and are set in advance.

The emergency email transmission intention input portion 0w3 is used to input an intention related to email transmission to an email address of a person concerned such as a relative of the monitoring target corresponding to the monitoring target identifier.

As illustrated in FIG. 4, the management screen 0w has a tracking band profile display portion 0w4 and a battery remaining amount display portion 0w6. The tracking band profile display portion 0w4 may indicate at least a part of the band status 0d12 besides the band identifier. In the battery remaining amount display portion 0w6, the battery remaining amount of the tracking band 1 is displayed, as an example, in the form of a bar gauge based on the band status 0d12.

As illustrated in FIG. 4, the management screen 0w has a control signal intention input portion 0w1 in which an intention for determining the control signal 0d2 can be input. In the control signal intention input portion 0w1, as an example, an acquisition schedule related to at least a part of the life log 0d11 can be set. As an example, the acquisition schedule may be set in the form of frequency such as every three hours, every three minutes, or every three seconds, may be set in the form of future time based on the current time such as three hours later, or may be set as a date and time such as 3 p.m. on March 3. Further, the control signal intention input portion 0w1 may be capable of setting such a control signal 0d2 that does not acquire a part of the life log 0d11 such as the location data. Further, the control signal intention input portion 0w1 is used for setting the control signal 0d2 that controls to perform the acquisition of the location data by the tracking band 1 based on the GPS. Although the acquisition schedule of the life log 0d11 can be adjusted by changing the setting, the acquisition schedule may be changed on condition that a J-ALERT or SOS is received. Further, the acquisition schedule to be changed at that time may be set in advance.

Figure 5:
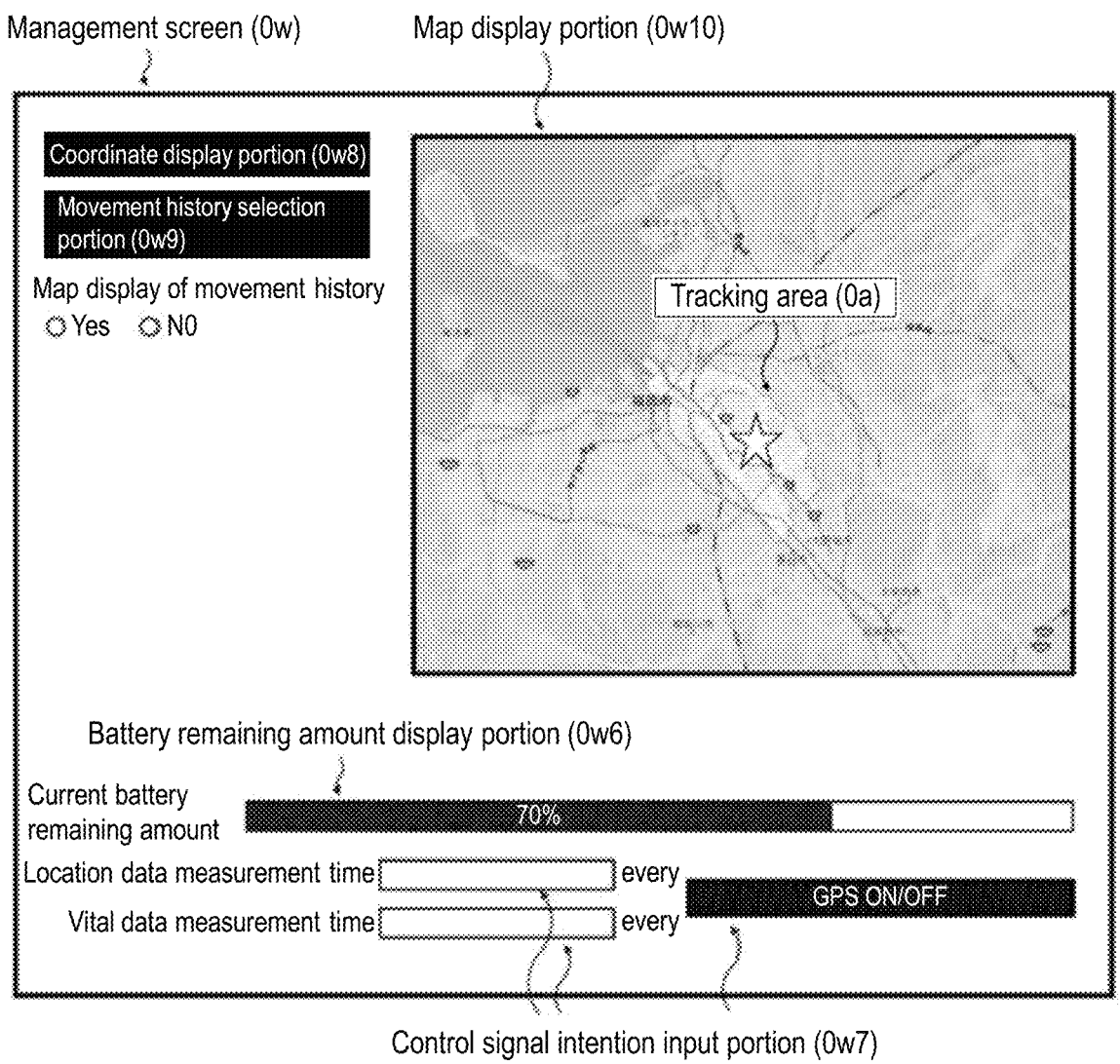
FIG. 5 shows a display example of the management screen according to Embodiment 1 of the present invention.

As illustrated in FIG. 5, the management screen 0w may include a coordinate display portion 0w8 indicating the current position of the tracking band 1, a movement history selection portion 0w9 in which the movement path of the tracking band 1 can be selected, and a map display portion 0w10 indicating the position coordinates and/or the movement path of the tracking band 1, instead of or in addition to at least a part of the foregoing display objects. At this time, the map display portion 0w10 may display the tracking area 0a.

The alert for the monitoring person according to one embodiment of the present invention is issued by changing the appearance of at least one of the display objects constituting the management screen 0w. Specifically, as an example, the alert for the monitoring person may be configured to be appropriately issued visually, audibly, and tactilely while indicating on the map display portion 0w10 that the tracking band 1 is located outside the tracking area 0a.

The relay device 2 according to one embodiment of the present invention may be configured to have a part of each means and each step included in the server 3. The tracking band monitoring system 0 according to one embodiment of the present invention may take a form of edge computing.

Embodiment 2

Hereinafter, a tracking band monitoring system according to Embodiment 2 of the present invention will be described. The same configurations as those in Embodiment 1 will be denoted by the same reference signs and the descriptions thereof will be omitted.

<Functional Block>

Figure 6:
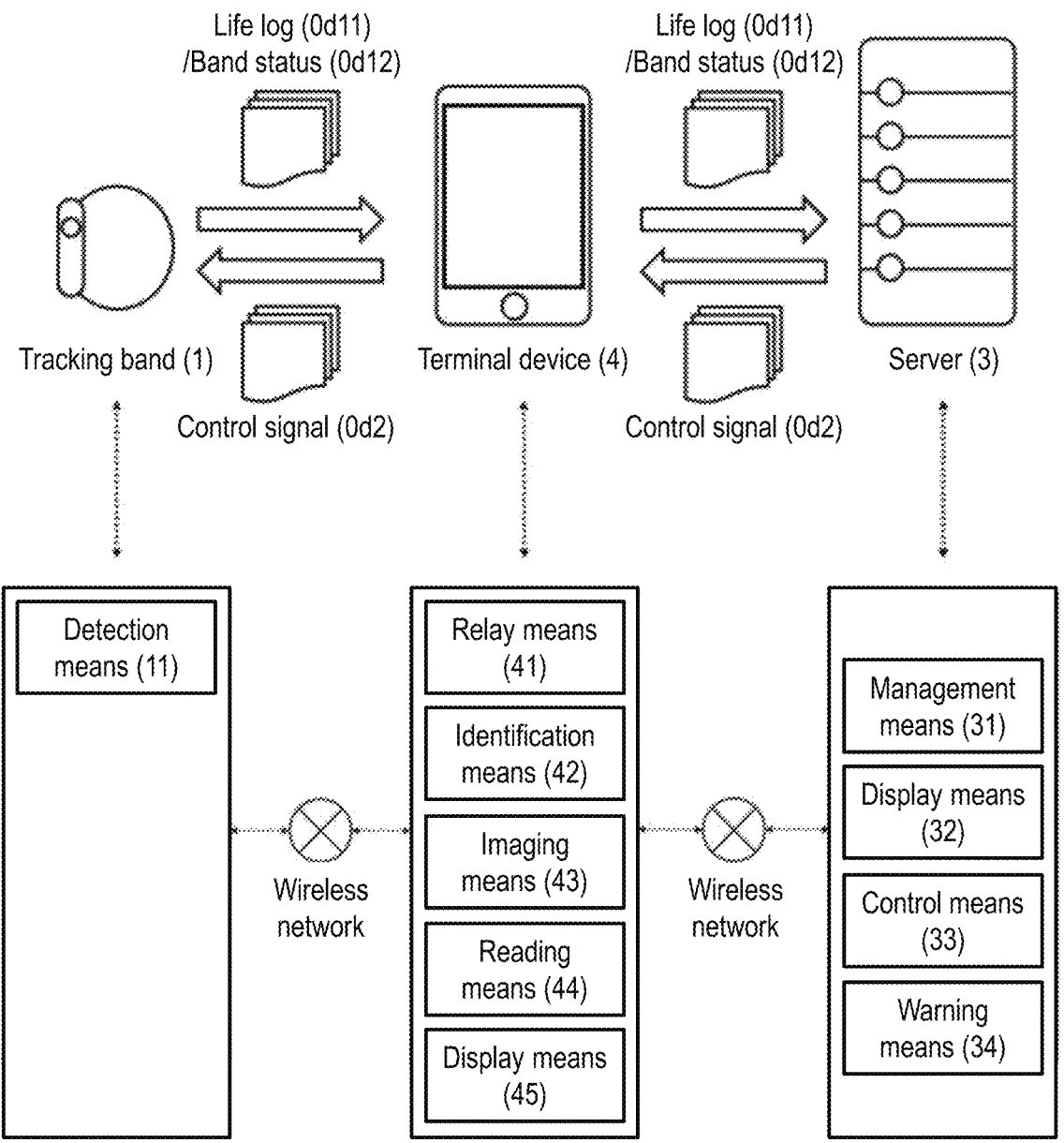
FIG. 6 shows a functional block diagram according to Embodiment 2 of the present invention.

As illustrated in FIG. 6, the tracking band monitoring system 0 in Embodiment 2 has a tracking band 1, a relay device 2 capable of assisting a search for a monitoring target when the monitoring target goes out of a tracking area 0a, and a server 3. There is no limit to the number of each of the tracking band 1, the relay device 2, and the server 3 according to one embodiment.

The tracking band 1 has a detection means 11 (detection step) for acquiring a life log 0d11 and transmitting the life log 0d11 and a band status 0d12 at least indicating a battery remaining amount of the tracking band 1 to the relay device 2 via a wireless network.

When the position of the tracking band 1 deviates from the tracking area 0a, the detection means 11 acquires position information of the tracking band 1 by positioning using a GPS satellite in a conventional outdoor positioning mode and transmits location data of the tracking band 1 to the relay device 2 based on the result of the positioning.

The tracking band 1 may be attached with a seal member on which a low-dimensional code corresponding to the tracking band 1 is printed. The low-dimensional code may be generated or issued by the server 3 and may be associated with a monitoring target identifier and a band identifier.

The relay device 2 has a relay means 21 (relay step) for receiving transmission data from the tracking band 1 and the server 3, performing data shaping of at least a part of the transmission data, and transmitting the transmission data to the server 3, an identification means 22 (identification step) for identifying the band identifier in each of a plurality of tracking bands 1 of different models and the transmission data from each of the tracking bands 1, an imaging means 23 (imaging step) for photographing a low-dimensional code, a reading means 24 (reading step) for reading the photographed low-dimensional code, and a display means 25 (display step) for displaying an application or a web page for inputting and outputting various information related to use of the tracking band monitoring system.

The relay device 2 is, as an example, a computer such as a smartphone, a tablet, and a laptop, which can be carried by a monitoring person and a family member or a relative of the monitoring target, etc. In this embodiment, a case is assumed in which a smartphone provided with a touch panel display as the display means 25 is used as the relay device 2. However, besides this, any computer device that exerts the same operation and effect, such as a tablet terminal, may be used. Further, the relay device 2 interconnects with the tracking band 1 via a wireless network. Further, the relay device 2 interconnects with the server 3 via a wireless network.

The relay device 2 stores a web browser application for accessing an application and/or a web page for inputting and outputting various information related to use of the tracking band monitoring system in this embodiment.

The imaging means 23 photographs a low-dimensional code in response to an operation to the relay device 2 by a searcher. Here, there is no limit to the dimension, resolution, and image effect of the low-dimensional code related to the photographing processing.

The reading means 24 cooperates with the imaging means 23 to perform reading processing of the low-dimensional code, thereby acquiring detailed information about the monitoring target corresponding to the monitoring target identifier and the band identifier associated with the low-dimensional code. As an example, the reading means 24 recognizes a portion of the low-dimensional code from an image or printed matter representing the low-dimensional code and performs decoding processing of the portion.

The display means 25 displays an application or a web page for inputting and outputting various information related to use of the tracking band monitoring system.

<Hardware Configuration>

Figure 7:
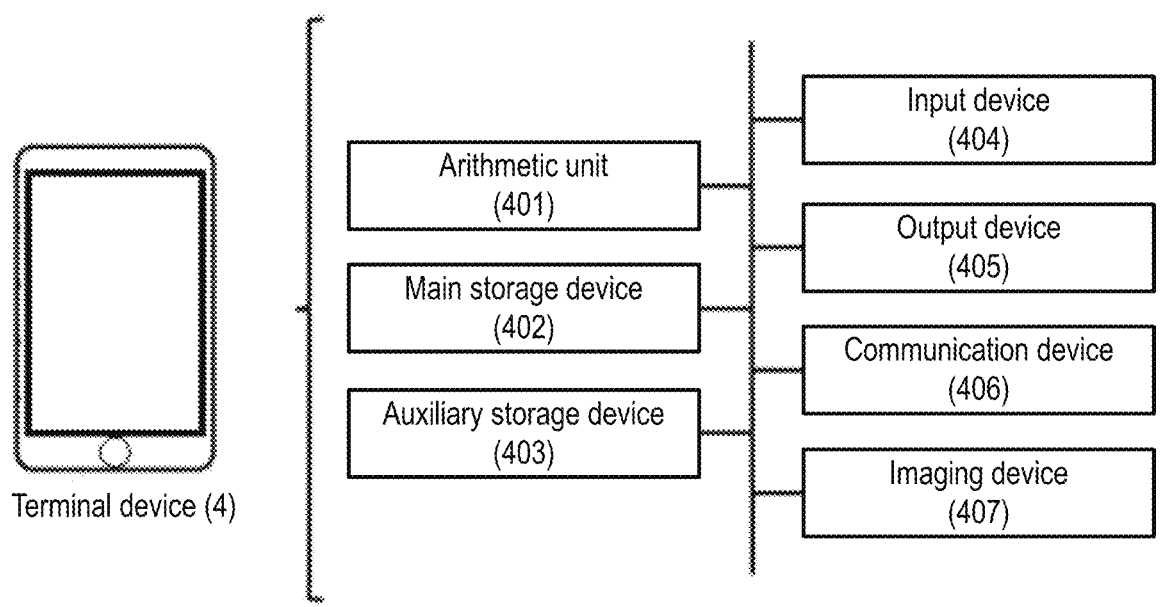
FIG. 7 shows a hardware configuration diagram according to Embodiment 2 of the present invention.

As illustrated in FIG. 7, the relay device 2 has an arithmetic unit 201, a main storage device 202, an auxiliary storage device 203, an input device 204, an output device 205, a communication device 206, an imaging device 207, and a bus interface. Each of these devices is appropriately used in exerting the operation and effect of each means and each step included in the relay device 2 described above.

The communication devices 106 and 206 are each such a known network interface that enables interconnection between the tracking band 1 and the relay device 2 on the wireless network described above. The communication devices 206 and 306 are each such a known network interface that enables interconnection between the relay device 2 and the server 3 on the wireless network.

The imaging device 207 is such a known image sensor that enables reading processing and imaging processing.

<Processing Sequence>

Figure 8:
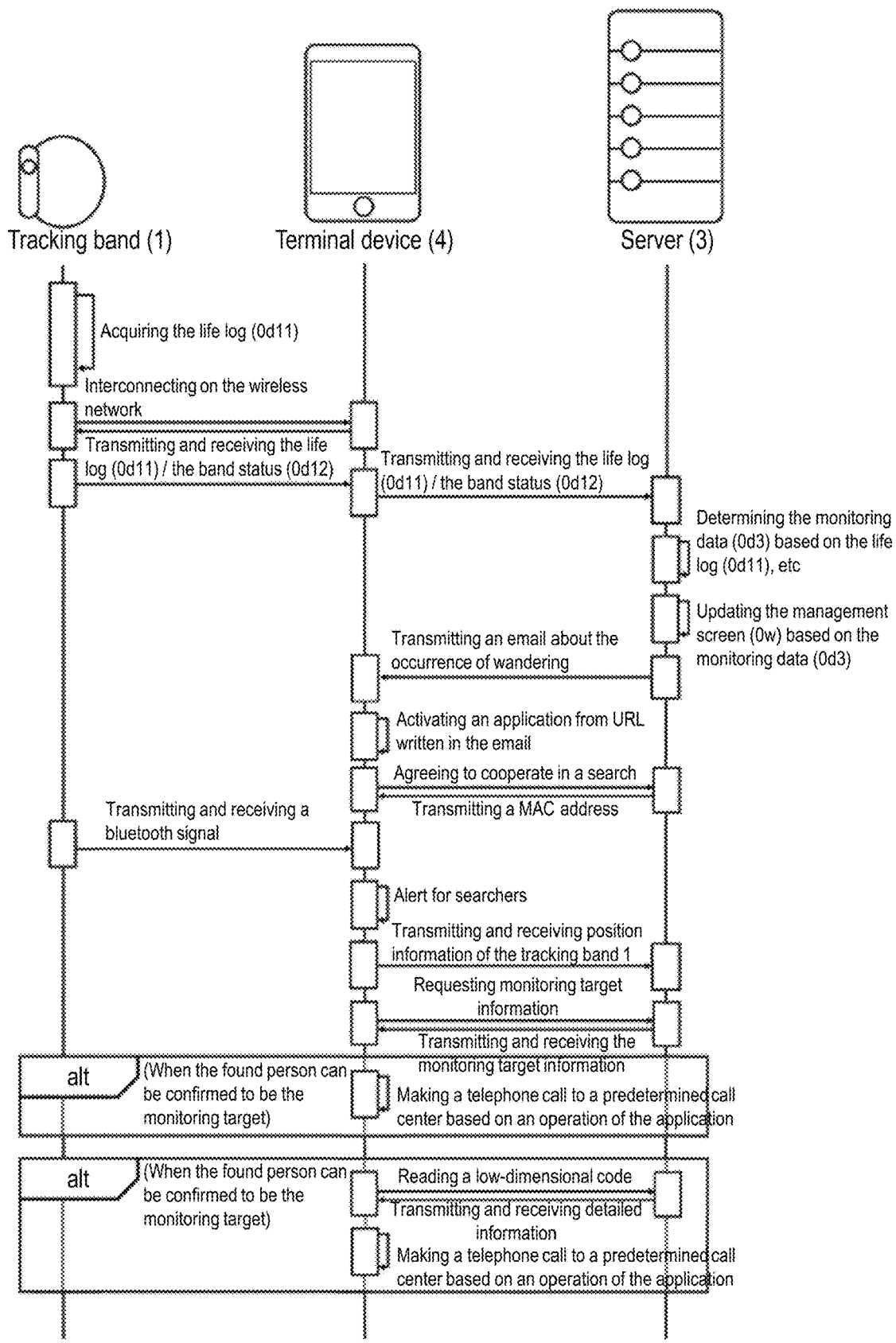
FIG. 8 shows a sequence diagram according to Embodiment 2 of the present invention.

As illustrated in FIG. 8, a tracking band search according to one embodiment of the present invention is performed according to the following procedures. First, the life log 0*d*11 including conventional location data indicating the position coordinates, the movement path, and the positioning result of the tracking band 1 is acquired by the tracking band 1. Next, interconnection between the tracking band 1 and the relay device 2 is performed. At this time, the tracking band 1 transmits transmission data including the life log 0*d*11 and the band status 0*d*12 to the relay device 2, and the relay device 2 receives the transmission data. After that, interconnection between the relay device 2 and the server 3 is performed and the relay device 2 transmits the transmission data to the server 3.

As illustrated in FIG. 8, the server 3 determines the monitoring data 0*d*3 based on the life log 0*d*11 and the band status 0*d*12 having been transmitted from the tracking band 1. After that, the server 3 updates the management screen 0*w* based on the monitoring data 0*d*3.

As illustrated in FIG. 8, the server 3 transmits an email notifying the occurrence of wandering to a family member or a relative of the monitoring target, etc., and a person who has the relay device 2 and is in the vicinity of the monitoring target on condition that the location data indicates the outside area of the tracking area 0*a*.

As illustrated in FIG. 8, the application stored in the relay device 2 is activated by specifying a URL written in the email. The relay device 2 acquires the band identifier of the tracking band 1 worn by the monitoring target from the server 3 on condition that the recipient of the email agrees to cooperate in a search for the monitoring target via the application.

In the description herein, a person who has received the email notifying the occurrence of wandering and agreed to cooperate in the search for the monitoring target is referred to as a "searcher".

As illustrated in FIG. 8, the relay device 2 searches for the tracking band 1 based on the acquired band identifier, and when capturing a signal from the tracking band 1, the relay device 2 issues an alert for the searcher and transmits the position information of the tracking band 1 to the server 3. The position information of the tracking band 1 is acquired based on the strength of the signal captured by the relay device 2 and based on the three-point positioning method.

As illustrated in FIG. 8, the searcher presses a monitoring target information request button displayed on the display means 25, whereby the relay device 2 acquires the monitoring target information from the server 3. Here, the monitoring target information may include at least one of name, birth date, gender, physical features, and profile image 0*w*1 of the monitoring target.

As illustrated in FIG. 8, the searcher can make a telephone call to the predetermined call center by pressing a call button displayed on the display means 25 when the searcher has found the monitoring target and is able to confirm that the found person is the monitoring target.

As illustrated in FIG. 8, when the searcher has found the monitoring target and is not able to confirm that the found person is the monitoring target, the searcher reads the low-dimensional code attached to the tracking band 1 by using the imaging means 23 and the reading means 24 included in the relay device 2, and then, can acquire detailed information related to the monitoring target and confirm whether the found person is the monitoring target by the monitoring target identifier associated with the low-dimensional code. Here, the detailed information that can be acquired by the relay device 2 is a part of information that can be displayed at least on the monitoring target profile display portion 0*w*2.

As illustrated in FIG. 8, when the searcher is able to confirm that the found person is the monitoring target by reading the low-dimensional code, the searcher can make a telephone call to the predetermined call center by pressing the call button displayed on the display means 25.

The location data according to one embodiment of the present invention may be configured to be acquired based on a terminal such as the tracking band 1 or the relay device 2 as appropriate in the form of a cloud GPS.

The tracking band 1 and the relay device 2 according to one embodiment of the present invention may include a waterproof and/or dustproof function. By including such a function, it becomes possible to detect the location of the monitoring target even when the monitoring target is caught in rubble or earth and sand in the event of disaster.

Further, in the tracking band monitoring system of the present invention, the relay means does not necessarily have to detect the tracking band via the wireless network, perform the positioning of the tracking band by interconnection via the wireless network, determine the location data of the tracking band based on the result of the positioning, and transmit the data to the server.

However, with such a configuration, it becomes easy to grasp the position of the tracking band even when the GPS function of the tracking band is turned off in order to suppress the power consumption of the tracking band, which is preferable.

Further, in the tracking band monitoring system of the present invention, the relay means does not necessarily have to receive the life log, which is the transmission data from the tracking band, perform data shaping of at least a part of the life log based on a predetermined data format, and transmit the life log to the server.

However, with such a configuration, the life logs based on the predetermined data format can be aggregated on the server regardless of the hardware configuration and the program configuration of a wide variety of tracking bands, which is preferable.

Further, in the tracking band monitoring system of the present invention, the detection means of the tracking band does not necessarily have to transmit both the vital data and the location data to the relay device and can transmit either one of the vital data or the location data to the relay device.

Along with this, the identification means of the relay device does not necessarily have to identify, based on the machine learning model, which vital data and location data in the tracking band monitoring system of the present invention both the vital data and the location data correspond to.

That is, the identification means of the relay device can identify, based on the machine learning model, which vital data or location data in the tracking band monitoring system of the present invention either one of the vital data or the location data corresponds to.

However, if the identification means identifies, based on the machine learning model, which vital data and location data in the tracking band monitoring system the vital data and the location data included in the life log having been received from the tracking band correspond to, it is preferable because data shaping according to the model of the tracking band worn by the monitoring target becomes possible even when the monitoring target replaces the tracking band.

Further, with such an identification means, both the vital data and the location data are used, so that it is preferable because, for example, when the monitoring target is in a dangerous situation, the monitoring person or the like can move to a place where the monitoring target is present to rescue the monitoring target.

Further, in the tracking band monitoring system of the present invention, the detection means of the tracking band does not necessarily have to transmit the band status to the relay device, and the management means of the server does not necessarily have to determine the monitoring data based on the band status.

However, if the monitoring data is determined based on the band status in addition to the life log, the status of the tracking band can also be grasped, so that it is preferable because the cause can be easily identified when the monitoring is delayed.

Further, in the tracking band monitoring system of the present invention, the server does not necessarily have to transmit an email notifying the occurrence of wandering to the relay device having the relay means and the identification means on condition that the location data indicates the outside area of the tracking area.

However, with such a configuration, a request for a search by a person having a relay device located in the vicinity of the monitoring target becomes possible, and it is preferable because quick protection is realized when the wandering or the like of the monitoring target occurs.

Further, in the tracking band monitoring system of the present invention, the server does not have to include the warning means for issuing, on the management screen in cooperation with the display means, an alert for the monitoring person for calling attention to an abnormality related to the monitoring target on condition that the location data indicates the outside area of the tracking area, and the management means does not necessarily have to determine the tracking area corresponding to the band identifier.

However, with such a configuration, the operation form in which wandering or the like of the monitoring target is immediately handled is realized, which is preferable.

Further, in the tracking band monitoring system of the present invention, the display means does not necessarily have to display the emergency contact code image corresponding to the tracking band on the management screen corresponding to the tracking band when the battery remaining amount is substantially zero.

Further, the terminal connected to the server does not necessarily have to read the emergency contact code image by using an image sensor, and does not necessarily have to acquire the band identifier associated with the emergency contact code image by succeeding in the reading and transmit a reading result, which is a result of the reading, including the band identifier to the server.

Further, the reading does not necessarily have to be a condition for causing the predetermined call center to perform a notification to the predetermined telephone number and/or email address corresponding to the band identifier.

However, with such a configuration, such suitable tracking band monitoring that can handle an unexpected situation in monitoring and protection of the monitoring target via the tracking band can be realized, which is preferable.

Further, in the tracking band monitoring system of the present invention, the control means does not necessarily have to cause the tracking band to execute the control signal, control at least one of the vibrator, the sound device, and the display device included in the tracking band, and issue an alert for the monitoring target.

However, with such a configuration, a power-saving alert and notification for the monitoring target by control via the relay device can be performed, which is preferable.

Further, in the tracking band monitoring system of the present invention, the control means does not necessarily have to determine the acquisition schedule of the life log acquired by the detection means by causing the tracking band to execute the control signal.

However, with such a configuration, the power consumption of the tracking band in the life log acquisition can be managed and adjusted, so that the operation period of the tracking band can be extended, which is preferable.

Further, in the tracking band monitoring system of the present invention, the management means does not necessarily have to associate the location data indicating that the monitoring target is located outside the tracking area with the monitoring data as a wandering route. However, with such a configuration, the wandering route of the monitoring target can be suitably managed, and the monitoring target can be suitably protected, which is preferable.

The present invention can provide a novel technique for realizing suitable tracking band monitoring by remotely performing monitoring and control related to the tracking band 1.

What is claimed is:

1. A tracking band monitoring system including a relay device that relays communication between a tracking band and a server, wherein
the relay device has
a relay means for receiving transmission data from the tracking band and the server and transmitting respective data to the server and the tracking band, and
an identification means for identifying a band identifier indicating the tracking band, the band identifier in each of a plurality of the tracking bands of different models, and the transmission data from each of the tracking bands, and
the transmission data received from the tracking band includes a life log including at least one of vital data or location data of a monitoring target wearing the tracking band having been acquired by the tracking band, and
the transmission data received from the server includes a control signal for controlling the tracking band having been determined by the server, and
the identification means identifies, based on the band identifier, which model the tracking band having transmitted the life log is, and
the identification means identifies, based on a machine learning model, which data in the tracking band monitoring system the data included in the life log having been received from the tracking band corresponds to, and
the tracking band including a detection device that acquires the life loci including the vital data and the location data, and a server, wherein
the tracking band has a detection means for acquiring the life log and transmitting the life loci and a band status at least indicating a battery remaining amount of the tracking band to the relay device via a wireless network, and
the server has a management means for associating a tracking area corresponding to the monitoring target, a monitoring target identifier indicating the monitoring target, and a band identifier indicating the tracking band and determining monitoring data based on the life log and the band status having been transmitted by the relay means, a display means for displaying a management screen corresponding to the band identifier based on at least a part of the monitoring data, and a control means for determining a control signal for controlling the tracking band based on an input operation to the management screen, transmitting the control signal to the tracking band via the relay device, and causing the tracking band to execute the control signal, and
the identification means identifies, based on a machine learning model, which vital data and location data in the tracking band monitoring system the vital data and the location data included in the life log having been received from the tracking band correspond to, wherein
the display means displays an emergency contact code image corresponding to the tracking band on the management screen corresponding to the tracking band when the battery remaining amount is substantially zero, and
a terminal
connected to the server reads the emergency contact code image by using an image sensor,
acquires the band identifier associated with the emergency contact code image by succeeding in the reading, and transmits a reading result, which is a result of the reading, including the band identifier to the server, and
the reading is a condition for causing a predetermined call center to perform a notification to a predetermined telephone number and/or email address corresponding to the band identifier.

2. The tracking band monitoring system according to claim 1, wherein the relay means detects the tracking band via a wireless network, performs positioning of the tracking band by interconnection via the wireless network, determines the location data of the tracking band based on the result of the positioning, and transmits the location data to the server.

3. The tracking band monitoring system according to claim 1, wherein the relay means receives the life log, which is the transmission data from the tracking band, performs data shaping of at least a part of the life log based on a predetermined data format, and transmits the life log to the server.

4. The tracking band monitoring system according to claim 1, wherein the server transmits an email notifying an occurrence of wandering to the relay device having the relay means and the identification means on condition that the location data indicates the outside area of the tracking area.

5. The tracking band monitoring system according to claim 1, wherein the server further has a warning means for issuing, on the management screen in cooperation with the display means, an alert for a monitoring person for calling attention to an abnormality related to the monitoring target on condition that the location data indicates the outside area of the tracking area, and
the management means determines a tracking area corresponding to the band identifier.

6. The tracking band monitoring system according to claim 1, wherein the control means causes the tracking band to execute the control signal, controls at least one of a vibrator, a sound device, and a display device included in the tracking band, and issues an alert for the monitoring target.

7. The tracking band monitoring system according to claim 1, wherein the control means determines an acquisition schedule of the life log acquired by the detection means by causing the tracking band to execute the control signal.

8. The tracking band monitoring system according to claim 1, wherein the management means associates the location data indicating that the monitoring target is located outside the tracking area with the monitoring data as a wandering route.

9. A tracking band monitoring method of executing a tracking band monitoring system including a relay device that relays communication between a tracking band and a server, comprising:
causing a processor of the relay device that relays communication between the tracking band and the server to execute a relay step of receiving transmission data from the tracking band and the server and transmitting respective data to the server and the tracking band;
causing the processor of the relay device to further execute a step of identifying, based on a band identifier indicating the tracking band, which model the tracking band having transmitted a life log including at least one of vital data or location data of a monitoring target wearing the tracking band is; and causing the processor of the relay device to further execute a step of identifying, based on a machine learning model, which data in the tracking band monitoring system the data included in the life log having been received from the tracking band corresponds to, wherein a detection step of acquiring a life log including the vital data and the location data and transmitting the life loci and a band status at least indicating a battery remaining amount of the tracking band to the relay device via a wireless network is executed by a processor of the tracking band including a detection device that acquires the life log, and a management step of associating a monitoring target identifier of the monitoring target and a band identifier of the tracking band and determining monitoring data based on the life log and the band status having been transmitted by the relay step, a display step of displaying a management screen based on at least a part of the monitoring data, and a control step of determining a control signal for controlling the tracking band based on an input operation to the management screen, transmitting the control signal to the tracking band via the relay device and the wireless network, and causing the tracking band to execute the control signal are executed by a processor of the server, and a step of identifying, based on a machine learning model, which vital data and location data in the tracking band monitoring system the vital data and the location data included in the life log having been received from the tracking band correspond to is further executed by the processor of the relay device.

10. The tracking band monitoring method according to claim 9, wherein a detection step of acquiring a life log including the vital data and the location data and transmitting the life log and a band status at least indicating a battery remaining amount of the tracking band to the relay device via a wireless network is executed by a processor of the tracking band including a detection device that acquires the life log, and a management step of associating a monitoring target identifier of the monitoring target and a band identifier of the tracking band and determining monitoring data based on the life log and the band status having been transmitted by the relay step, a display step of displaying a management screen based on at least a part of the monitoring data, and a control step of determining a control signal for controlling the tracking band based on an input operation to the management screen, transmitting the control signal to the tracking band via the relay device and the wireless network, and causing the tracking band to execute the control signal are executed by a processor of the server, and a step of identifying, based on a machine learning model, which vital data and location data in the tracking band monitoring system the vital data and the location data included in the life log having been received from the tracking band correspond to is further executed by the processor of the relay device.

11. A non-transitory computer-readable storage medium tracking band monitoring program for executing a tracking band monitoring system including a relay device that relays communication between a tracking band and a server, the program comprising:

causing the relay device to function as a relay means for receiving transmission data from the server and the tracking band and transmitting respective data to the server and the tracking band;

causing the relay device to function as a means for identifying, based on a band identifier indicating the tracking band, which model the tracking band having transmitted a life log including at least one of vital data or location data of a monitoring target wearing the tracking band is; and causing the relay device to function as a means for identifying, based on a machine learning model, which data in the tracking band monitoring system the data included in the life log having been received from the tracking band corresponds to wherein the tracking band including a detection device that acquires the life log including the vital data and the location data is caused to function as a detection means for acquiring the life loci and transmitting the life loci and a band status at least indicating a battery remaining amount of the tracking band to the relay device via a wireless network, and the server is caused to function as a management means for associating a monitoring target identifier of the monitoring target and a band identifier of the tracking band and determining monitoring data based on the life log and the band status having been transmitted by the relay means, a display means for displaying a management screen based on at least a part of the monitoring data, and a control means for determining a control signal for controlling the tracking band based on an input operation to the management screen, transmitting the control signal to the tracking band via the relay device and the wireless network, and causing the tracking band to execute the control signal, and the relay device is caused to function as a means for identifying, based on a machine learning model, which vital data and location data in the tracking band monitoring system the vital data and the location data included in the life loci having been received from the tracking band correspond to.

12. The non-transitory computer-readable storage medium according to claim 11, wherein the tracking band including a detection device that acquires a life log including the vital data and the location data is caused to function as a detection means for acquiring the life log and transmitting the life log and a band status at least indicating a battery remaining amount of the tracking band to the relay device via a wireless network, and the server is caused to function as a management means for associating a monitoring target identifier of the monitoring target and a band identifier of the tracking band and determining monitoring data based on the life log and the band status having been transmitted by the relay means, a display means for displaying a management screen based on at least a part of the monitoring data, and a control means for determining a control signal for controlling the tracking band based on an input operation to the management screen, transmitting the control signal to the tracking band via the relay device and the wireless network, and causing the tracking band to execute the control signal, and the relay device is caused to function as a means for identifying, based on a machine learning model, which vital data and location data in the tracking band monitoring system the vital data and the location data included in the life log having been received from the tracking band correspond to.

\* \* \* \* \*